US007089848B2

(12) United States Patent
McCrary

(10) Patent No.: US 7,089,848 B2
(45) Date of Patent: Aug. 15, 2006

(54) NON-ROTATING DOUBLE ACTING PISTON AND CYLINDER ASSEMBLY

(75) Inventor: Michael O'Neal McCrary, Hampshire, TN (US)

(73) Assignee: Numatics, Incorporated, Highland, MI (US)

( * ) Notice: Subject to any disclaimer, the term of this patent is extended or adjusted under 35 U.S.C. 154(b) by 0 days.

(21) Appl. No.: 11/020,687

(22) Filed: Dec. 22, 2004

(65) Prior Publication Data

US 2006/0130645 A1 Jun. 22, 2006

(51) Int. Cl.
*F16J 15/18* (2006.01)

(52) U.S. Cl. ................................................ 92/165 PR

(58) Field of Classification Search .............. 92/165 R, 92/165 PR

See application file for complete search history.

(56) References Cited

U.S. PATENT DOCUMENTS

| | | | | |
|---|---|---|---|---|
| 3,835,753 | A | | 9/1974 | Bunyard |
| 4,111,100 | A | | 9/1978 | Boyer |
| 4,119,017 | A | | 10/1978 | Nusbaumer et al. |
| 4,796,516 | A | | 1/1989 | Horvath |
| 4,932,313 | A | | 6/1990 | Gutknecht |
| 5,761,985 | A | * | 6/1998 | Stoll ...................... 92/165 PR |
| 5,782,162 | A | | 7/1998 | Lanteigne et al. |
| 5,865,089 | A | | 2/1999 | Langer et al. |
| 6,029,561 | A | | 2/2000 | Naslund et al. |
| 6,132,092 | A | | 10/2000 | Edelmann et al. |
| 6,526,865 | B1 | | 3/2003 | Weedon |
| 6,619,844 | B1 | | 9/2003 | Baalmann et al. |

OTHER PUBLICATIONS

Linear System, NB Website, 6 pages.

* cited by examiner

*Primary Examiner*—Thomas E. Lazo
(74) *Attorney, Agent, or Firm*—Reising, Ethington, Barnes, Kisselle, P.C.

(57) ABSTRACT

A fluid actuated piston and cylinder assembly with a cylinder housing having a head end and a cap end with a piston slidably reclined within the cylinder. A piston rod is attached to the piston for sliding movement with respect to the cylinder housing between an extended position and a retracted position with the piston rod extending out of the head end of the cylinder housing. A linear bearing assembly is interposed between the cylinder housing and piston rod for slidably engaging the piston rod along the axial direction with respect to the cylinder head. The linear bearing assembly frictionally engages the rod to prevent relative rotation motion between the piston rod and the cylinder.

7 Claims, 2 Drawing Sheets

NON-ROTATING DOUBLE ACTING PISTON AND CYLINDER ASSEMBLY

TECHNICAL FIELD

The field of this invention relates to piston and cylinder assemblies and more particularly to double acting fluid pressure piston and cylinder assemblies.

BACKGROUND OF THE DISCLOSURE

Piston and cylinder assemblies have long been used in a variety of machines that provide repetitive linear motion. The repetitive linear motion is caused by a piston rod moving between an extended and a retracted position. The piston rod is moved by reciprocating motion of the attached piston within the cylinder. The piston is moved by controlled pneumatic or fluid pressure exerted against the piston to move the piston rod with respect to the cylinder.

Various linkages or tools may be mounted onto the piston rod. Certain tools such as welding guns or clamps need to be rotationally affixed in a certain location. Consequently, certain cylinders and piston rods are equipped with an anti-rotation device to prevent the piston rod from rotating with respect to the cylinder. These devices may be in the form of a square piston rod extending through a complementary square hole in the cylinder head.

These type of non-rotatable piston and cylinder assemblies however cannot provide a leak proof seal or gasket about the square hole and square rod so the device cannot be double acting. A substitute return mechanism is often provided by the introduction of a compression spring positioned about the shaft above the piston and within the cylinder to return the piston and rod to the retracted position. The introduction of the spring adds extra complexity to the piston rod and further demands additional fluid pressure to overcome the continuous retracting bias of the spring.

Double acting cylinder and piston rod assemblies are often greatly desired because of the more precise and positive control for movement in both the extending and retracting directions. One does not merely rely on the biasing force of the spring for retraction but can more precisely and more forcefully retract the piston rod by having fluid pressure exerted on the top surface of the piston while the pressure is relieved on the bottom surface of the piston.

However, most double acting cylinder and piston rods do not have any anti-rotation device built therein and require additional exterior anti-rotation devices which add complexity and expense to the device. Some internal anti-rotation devices in the form of an interior splined shaft mounted in the cylinder are known. These interior splined shafts require special non-solid piston heads with a non-round hole machined therethrough.

What is needed is a double acting non-rotating piston and cylinder assembly that is made from standard pistons, rods, and cylinder components. What is also needed is an anti-rotation device that can be installed in the cylinder and mounted onto a standard piston and cylinder assembly about the piston rod to prevent the piston rod from rotating with respect to the cylinder.

SUMMARY OF THE DISCLOSURE

In accordance with one aspect of the invention, a fluid actuated piston and cylinder assembly includes a cylinder housing having a head end and cap end with a piston slidably mounted within the cylinder. A piston rod is attached to the piston for slidable movement with respect to the cylinder housing between an extended position and retracted position with the piston rod extending out of the head end of the cylinder housing.

A fluid port is in communication with the cylinder housing to provide fluid pressure at a cap section of the cylinder housing to act against a first surface of the piston for extending the piston rod. A mechanism retracts the piston rod into the cylinder when the fluid pressure in the cap section is relieved. At least, the portion of the rod engaged by the bearing assembly has a circular cross-section.

A linear bearing assembly is radially interposed between the cylinder housing and piston rod for slidably engaging the piston rod along the axial direction with respect to the cylinder head. The linear bearing assembly has a race with bearings loaded thereagainst to be fitted against relative rotatable motion between the piston rod and the cylinder. Preferably the linear bearing assembly is affixed to the cylinder housing with radially inner positioned bearings loaded against its race for axially rolling between its race and the piston rod but restricted from rolling in a circumferential direction about the piston rod and provides fit contact between the piston rod and its race to prevent the piston rod from rotating with respect to the cylinder housing. The linear bearing assembly has an unloaded return track for the bearings.

In one embodiment the cylinder housing has a cylinder body and a cylinder head affixed to the cylinder body with the linear bearing assembly being press fitted in the cylinder head.

It is desirable that the mechanism for retracting the piston rod includes the cylinder body having at or near its head end a second fluid port to provide fluid pressure at a head section of the cylinder body to act against a second surface of the piston for retracting the piston rod. The cylinder housing is provided with an annular seal about the piston rod extending out of the cylinder housing for sealing against fluid pressure within the head section of the cylinder.

In accordance with another aspect of the invention, a double acting fluid actuated piston and cylinder assembly has a cylinder housing with a head end and cap end. The cylinder housing has fluid ports in proximity to the respective head end and cap end. A piston has first and second opposite surfaces facing opposite ends of the cylinder housing and slidably mounted in the cylinder housing.

The piston rod is attached to the piston within the cylinder between the fluid ports. A piston rod is attached to the piston for being slidably movable with respect to the cylinder housing between an extended position and a retracted position with the piston rod extending out of the cylinder housing through a round aperture.

An annular seal is mounted at the round aperture for slidably sealing against the piston rod for sealing pressure within the cylinder housing about the piston rod. The cylinder housing has a linear bearing assembly therein. The linear bearing assembly is annular in shape and sized to slidably receive the piston rod. The bearings within the linear bearing assembly are under load and functionally prevent rotation of the piston rod with respect to the cylinder housing. Preferably, the cylinder housing has a cylinder body and a cylinder head affixed to the cylinder body and the linear bearing assembly is press fitted in the cylinder head. The linear bearing assembly is preferably positioned at the head side of the annular seal.

BRIEF DESCRIPTION OF THE DRAWINGS

Reference now is made to the accompanying drawings in which.

DETAILED DESCRIPTION OF THE PREFERRED EMBODIMENT

Figure 1:
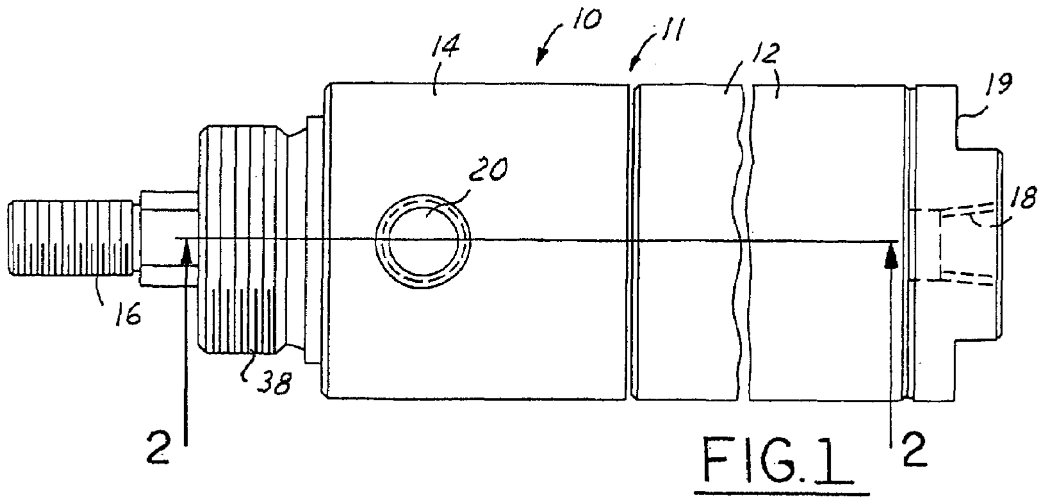
FIG. 1 is a perspective view of an embodiment of a cylinder assembly in accordance with the invention.
Figure 2:
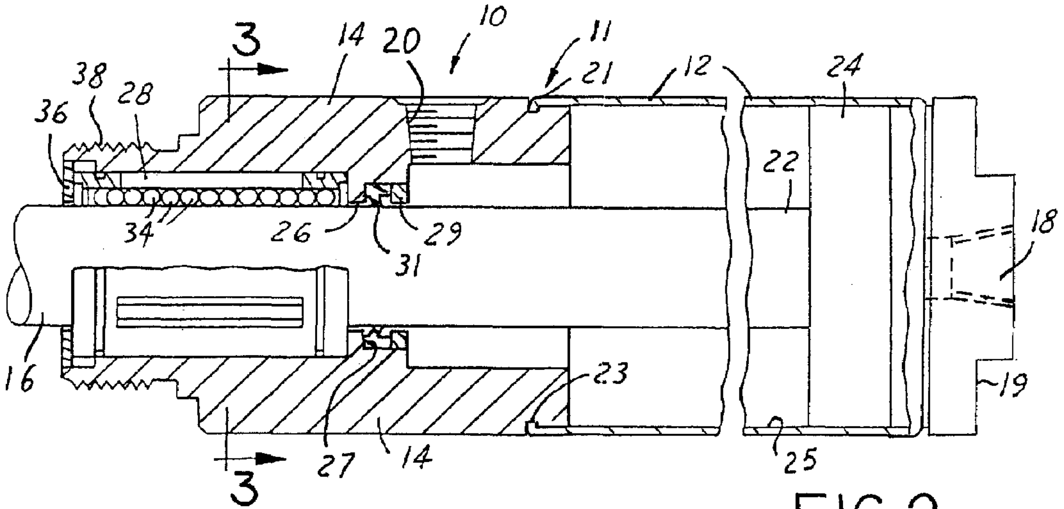
FIG. 2 is a segmented side elevational view of the cylinder assembly taken along line 2—2 shown in FIG. 1.

Referring now to FIG. 1, a double acting fluid cylinder assembly 10 has a cylinder housing 11 with a piston rod 16 that extends therefrom for movement between a retracted position and extended position without rotating with respect to the cylinder housing 11. The housing 11 includes a tubular annular body 12 attached and sealed to a head 14. The cylinder head 14 as shown in FIG. 2 has a groove 23 in which the head end 21 of the cylinder body 12 is crimped therein to affix and seal the two members 12 and 14 together.

Conventional pneumatic cylinder terminology will be used herein even thought it is foreseen that this invention can be used with hydraulic cylinders which may use different terminology. The cylinder housing 11 has a lower inlet port 18 at its cap end 19 that can be connected to a pressurized fluid supply (not shown). Similarly, cylinder head 14 has an inlet port 20 also can be connected to a pressurized fluid supply (not shown). As more clearly shown in FIG. 2, one end 22 of the piston rod 16 is connected to working piston 24 which has a sliding seal with the inside wall 25 of the cylinder body 12. Pressure from the inlet port 18 forcibly moves the piston to extend the rod 16 outwardly. On the other hand, application of pressure to the inlet port 20 moves the piston 24 toward the cap end 19 and retracts the piston rod 16 upon release as relief of the fluid pressure near the cap end 19.

The rod 16 is round or circular in cross-section and passes through top aperture 26 in cylinder head 14. A quad or lip seal 31 is placed within cylinder head 14 about the rod 16 and seated at the aperture 26 to provide a seal for the pressurized fluid within the cylinder from escaping through the aperture 26 about the rod 16. The lip seal 31 is seated against shoulder 27 within head 14 and is retained in place by a press fit retainer ring 29.

A linear bearing assembly 28 is preferably press fitted within the aperture 26 at the head end of the aperture 26 outboard of or beyond where the lip seal 31 engages the piston rod 16. The linear bearing 28 has an annular body 30 and longitudinal metal races 32 mounted within the body. When the linear bearing assembly is fitted within the cylinder head, the races 32 are also moved radially inward to move the roller balls such that the balls 34 tightly abut against the rod 16. The linear bearing assembly 28 is commercially available. One such bearing assembly contemplated is produced by NB Corporation of America of Wood Dale, Ill. as a TW type linear bearing often referred to as a slide bush.

A stainless steel retainer washer 36 is fitted over the roller bearing and is preferably pressed fitted in the end of the cylinder head aperture. Preferably, the exterior of head 14 has external threads 38 for nose mounting of the cylinder.

Figure 3:
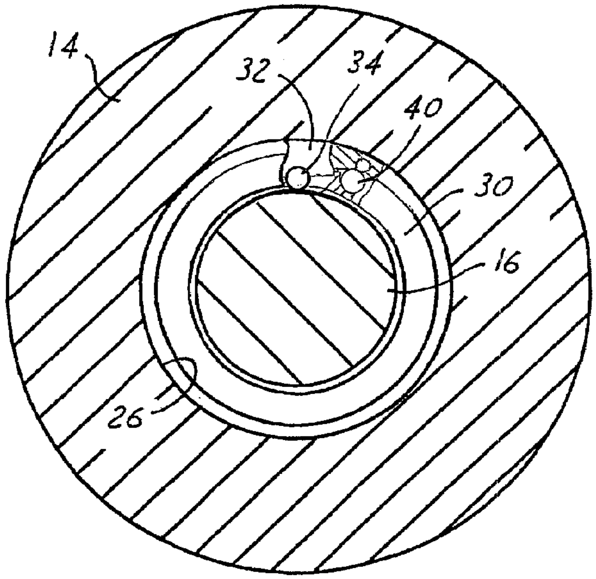
FIG. 3 is a cross-sectional view taken along lines 3—3 shown in FIG. 2.
Figure 4:
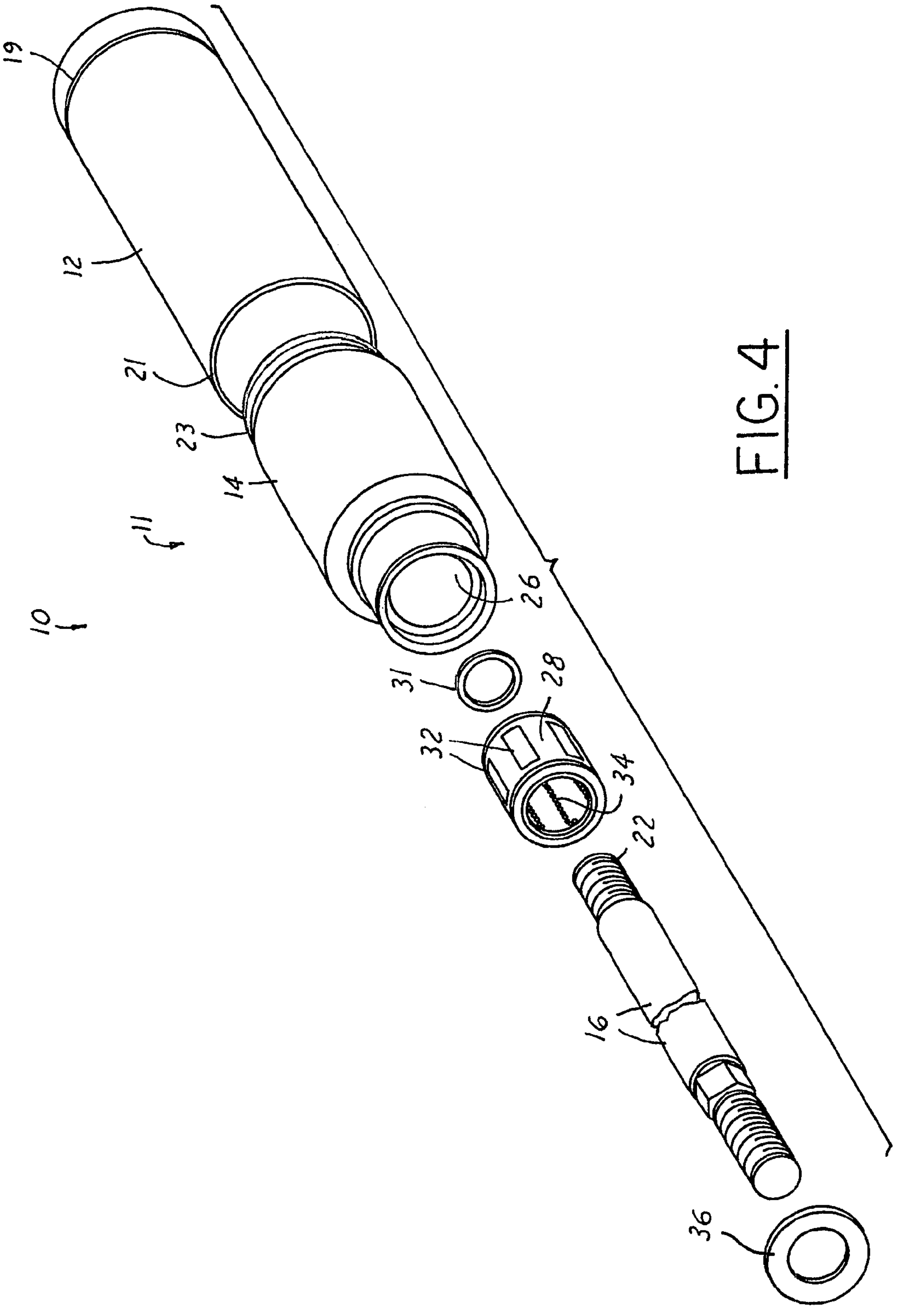
FIG. 4 is a partially exploded view of the assembly shown in FIG. 1.

As shown in FIG. 3, the metal race 32 is pressed radially inward to press the balls into point contact with the rod 16. The rod 16 is hardened steel so that the bearing balls 34 do not cut into or score the rod. The head 14 when made from aluminum is also surface hardened to prevent the metal races 32 from cutting into or scoring the aluminum.

The balls 34 within the linear bearing can roll with the reciprocal axial motion of the rod. The balls can roll between the rod and its race 32 because the ball have a return track 40 once the balls run out of race 32. However, the balls 34 because they are loaded against the races 32 are not free to rotate in the lateral direction, i.e. circumferentially about the rod because the races do not move in that direction and thus are frictionally engaged to the race and rod. If the balls are loaded enough, i.e. by a firm press fit, the effective result is that the rod is prohibited from rotating about its axis relative to the cylinder body. This affixation in the circumferential direction does not deter the balls from the free linear, i.e. axial, motion of the rod with respect to the cylinder body 12.

Thus it can be easily seen that a tool mounted to the rod 16 at a certain circumferential position will retain this circumferential position even during reciprocal linear motion of the tool while on the rod. This circumferential retention is accomplished without extra brackets or mounts. Tests have been conducted on ⅝ inch piston rods with a 2 inch bore cylinder. When using an NB Corporation's model TW 10 bearing assembly, the piston rod has been circumferentially restrained and retained from rotation with respect to the cylinder body with 40 inch-pounds of torque exerted on the rod.

It is foreseen that other brands or other types of linear bearings such as roller bearings can also be interposed between the piston rod and cylinder in other fashions to accomplish the reciprocal rolling function but restrain any rotation of the piston rod with respect to the cylinder body.

It can also be foreseen that this device can be used for single acting cylinders that use spring returns in certain applications.

Other variations and modifications are possible without departing from the scope and spirit of the present invention as defined by the appended claims.

The invention claimed is:

1. A fluid actuated piston and cylinder assembly comprising:

a cylinder housing having a head end and cap end;

a piston slidably mounted within said cylinder;

a piston rod attached to said piston for being slidably movable with respect to said cylinder housing between an extended position and retracted position with said piston rod extending out of said head end of said cylinder housing;

said cylinder having a first fluid port communicating with the interior of the cylinder housing adjacent the cap end to act against a first surface of said piston for extending said piston rod;

a mechanism for retracting said piston rod into said cylinder when said fluid pressure in said cap section is relieved; and a linear bearing assembly radially interposed between the cylinder housing and piston rod for slidably engaging the piston rod along the axial direction with respect to the cylinder; said linear bearing assembly being fitted against relative rotation between the piston rod and the cylinder housing.

2. A fluid actuated piston and cylinder assembly as defined in claim 1 further comprising:

said linear bearing assembly being affixed to said cylinder housing with radially inner positioned bearings loaded against a race of said lining bearing assembly for rolling between said race and said piston rod and having an unloaded return track for said bearings; and said radially inner positioned loaded bearings being restricted from rolling in a circumferential direction about the piston rod and to provide a frictional fit between said piston rod and said cylinder housing to prevent the piston rod from rotating with respect to the cylinder.

3. A fluid actuated piston and cylinder assembly as defined in claim 2 further comprising:

said cylinder housing having a cylinder body and a cylinder head affixed to said cylinder body; and said linear bearing assembly being press fitted in said cylinder head.

4. A fluid actuated piston and cylinder assembly as defined in claim 3 further comprising:

said mechanism for retracting said piston rod including said cylinder body having at or near its head end a second fluid port to provide fluid pressure at a head section of said cylinder body to act against a second surface of said piston for retracting said piston rod; and said cylinder housing being provided with an annular seal about said piston rod extending out of said cylinder housing for sealing against fluid pressure within said head section of said cylinder housing.

5. A double acting fluid actuated piston and cylinder assembly comprising:

a cylinder housing having a head end and cap end;

said cylinder housing having a fluid port adjacent each end;

a piston having first and second opposite surfaces facing opposite head and cap ends of said cylinder housing and slidably mounted in said cylinder housing;

a piston rod attached to said piston for being slidably movable with respect to said cylinder housing between an extended position and a retracted position with said piston rod extending out of said cylinder housing through a round aperture;

an annular seal mounted at said round aperture for slidably sealing against said piston rod for sealing pressure within said cylinder housing about said piston rod; and said cylinder housing having a linear bearing assembly therein, the linear bearing assembly being annular in shape and sized to slidably receive said piston rod with bearings within the linear bearing assembly being under load and frictionally preventing rotation of said piston rod with respect to said cylinder housing.

6. A double acting fluid actuated piston and cylinder assembly as defined in claim 5 further comprising:

said cylinder housing having a cylinder body and a cylinder head affixed to said cylinder body; and said linear bearing assembly being press fitted in said cylinder head.

7. A double acting fluid actuated piston and cylinder assembly as defined in claim 6 further comprising:

said linear bearing assembly being positioned at the head side of said annular seal.

* * * * *